United States Patent

[11] 3,622,390

[72] Inventors Ronald W. Hevey
 Piscataway, N.J.;
 Elbert Erskine Hopkins, Wilmington, Del.
[21] Appl. No. 800,286
[22] Filed Feb. 18, 1969
[45] Patented Nov. 23, 1971
[73] Assignee E. I. du Pont de Nemours and Company
 Wilmington, Del.

[54] PROCESS FOR IMPROVING CAPACITORS
 3 Claims, No Drawings
[52] U.S. Cl. .................................................. 134/2,
 134/30, 148/6.27
[51] Int. Cl. .................................................. B08b 3/00
[50] Field of Search ......................................... 134/2, 30,
 42; 148/6.27

[56] References Cited
UNITED STATES PATENTS
2,859,148 11/1958 Altenpohl .................. 148/6.27
2,981,647 4/1961 Schwartz ..................... 148/6.27 X
3,039,898 6/1962 Keller et al. ................. 148/6.27 X
3,039,899 6/1962 Keller et al. ................. 148/6.27 X OTHER REFERENCES
" Sealing of Anodic Films on Aluminum and its Alloys," Spooner, Metal Finishing, Dec. 1968, (pp. 44– 45 relied upon)

*Primary Examiner*—Morris O. Wolk
*Assistant Examiner*—Joseph T. Zatarga
*Attorney*—Frank R. Ortolani ABSTRACT: The treatment of electrode foils with aerated water at a temperature of about 10° to 125° C. for several minutes to an hour, followed by drying, to decrease the failure rate of wound capacitors under voltage stress.

PROCESS FOR IMPROVING CAPACITORS

BACKGROUND OF THE INVENTION

Electrical capacitors of the film/foil type are widely used in the electronic industry. An important criteria in the choice of a capacitor construction is the life performance of the foil and dielectric combination. The generally accepted qualification test for life performance is an accelerated test at elevated voltages and at rated temperatures. A correlation is made between these results and the expected absolute life performance under actual conditions.

The elements of a capacitor consist of two or more spaced conductors maintained at different potentials and separated by thin layers of dielectric. Absolute failure occurs when the dielectric can no longer prevent substantial current flow between the electrodes. The failure may occur by dielectric fatigue, which is a way of describing the loss in time of the ability of a capacitor to hold charge due to repeated or prolonged application of voltage stress. Although all of the factors associated with dielectric fatigue are not understood, failures are known to occur in localized areas where the voltage stress is high, such as points on the electrodes or where foreign granules of conductive materials are incorporated in the structure. It is impractical to examine in detail the surface of the electrodes and remove these undesirable points or areas and indeed such examination would be partially fruitless for failure sites are not always to be identified. Consequently, it is common practice to rate a capacitor at some voltage less than the maximum possible in order to avoid premature failure.

SUMMARY OF THE INVENTION

It has now been discovered that capacitors with improved life can be obtained by subjecting a capacitor preform, or a foil element thereof, to aerated heated water for a period of time such that the product of time in minutes and temperature in degrees centigrade exceeds 200, and drying at a temperature in excess of 45° C. This process appears to remove or reduce active points or areas on the electrode foils, which are believed to be sites at which electrical breakdown occurs. It is further believed that the foil surfaces become passivated by this treatment. In any event capacitors so treated, either as such or by having the process applied to one or more of its elements during manufacture, show marked improvement in life performance tests.

The invention is carried out by immersing the preform, foil or the like in heated water for a sufficient period of time and thereafter drying the treated part. Broadly considered the aerated water can be at a temperature of 10° to 125° C., with about 50° to 60° C. being preferred. Obviously pressure may be applied to secure the higher temperatures. Treating time generally is about 2 to 60 minutes or more. Drying, which must be carried out at a temperature of at least 45° C., preferably is accomplished at 90° to 110° C. for a few minutes to 2 or more hours. The electrode foils can be treated as such, or they can be wound with the conventional dielectric separator film and treated in that form. It is also within the scope of the discovery to apply the process to a fully wound capacitor preform, that is, a capacitor prior to attachment of leads or encapsulation.

As used herein, the term aerated water includes water containing air or oxygen either naturally or because of aeration, and water in the form of a condensed layer on the surface to be treated where air or oxygen is also present. Actually the water used may be distilled water, but need not be especially highly purified. The purpose of distilling or deionizing water is to remove components which might be deleterious to the dielectric, such as chloride. As long as at least a layer of water is on the surface of the electrode and air or oxygen is present, reaction suitable for purposes of this invention will occur. Hence broadly considered any water treatment as indicated and where air is not excluded constitutes suitable aerated water contact or treatment for purposes of this discovery.

Electrode foils that have been successfully used in practice of the present discovery include aluminum foils and lead base foils, such as lead/tin foil. The aluminum foils can be substantially pure aluminum or can contain alloy ingredients, such as silicon, magnesium, and copper, as long as the electrical and mechanical properties of the foil are not impaired. The foils used can be from 0.05 to 10 mils in thickness. A typical aluminum foil is Republic Electro-Dry (Alloy 1145) which contains about 99.45 percent aluminum, 0.055 percent silicon and iron, 0.05 percent or less copper, 0.05 percent or less magnesium with other elements not more than 0.3 percent.

The choice of dielectric or other conventional portion of a capacitor forms no part of this discovery. Any of the usual dielectrics can be used, with films of biaxially oriented polyethylene terephthalate being preferred. Other useful materials include perfluorocarbon polymer and polyimide. In instances, the choice of dielectric can require that one procedure of the invention be used rather than another. For example, a dielectric such as soluble polyvinyl alcohol is adversely affected by short exposures to heated water. Therefore the foils used with such dielectric should be treated before winding a capacitor. It is preferred in general to treat a wound capacitor preform rather than the foil alone. The water treatment of a roll of foil alone may lead to blocking and tearing on rewinding. Indeed it is surprising to propose water treatment in an industry which is normally careful to protect the components from moisture. Further, since heating to stabilize the electrical characteristics of a wound capacitor is common practice, the drying to remove water required by the present discovery can be readily combined with that heating without additional process equipment. As an example, a polyester foil capacitor preform may be heated for 4 hours at 150° C. to shrink slightly the dielectric and to stabilize the electrical characteristics of the capacitor. In the case of applying that heat treatment to a water treated preform, it may be desirable to heat a short time, 15–30 minutes, near but below 100° C. before raising the temperature to its final value to avoid damage by the too rapid release of moisture within the preform.

Once the preform has been prepared with the passivated electrodes the capacitor can be completed for use by means known in the art. For example, pigtail leads can be attached to the electrodes. Further, the capacitor can be impregnated with mineral oil or other dielectric liquids or meltable solids to exclude air and eliminate corona at high voltages. Additionally, the capacitor can be encapsulated in a hardening resin to prevent foreign material such as dust moisture or corrosive atmosphere from affecting the capacitor. Leads also can be provided as in Hevey, Ser. No. 612,912, filed Jan. 31, 1967.

The failure rate per thousand hours (FR) is a measure of capacitor performance. A number of capacitors are tested at a selected temperature and DC voltage and the time to failure is recorded for each capacitor if failure occurs or the time is taken as the duration of the test. A failure occurs when a capacitor shorts. Calculation is as follows:

$$FR = \frac{\text{Number of capacitors failures} \times 1000}{\text{Total hours of all capacitor operation}}$$

Thus, if 10 capacitors were tested for 100 hours and three failed (20 hrs., 40 hrs., & 60 hrs.)

$$FR = \frac{3}{+100+100+100+100+100+100+100+20+40+60} \times 1000$$

$$= \frac{3,000}{820} = 3.66 \text{ or } 366\%$$

The failure rate per thousand hours (FR) as defined above is statistically at the 50 percent confidence level. It will be noted that in any test terminated before all of the capacitors have failed the FR will be higher than the final value.

The calculation of failure rate at other levels of statistical confidence is given by D. F. Schmidt, Proceedings of the 1963 Electronics components Conference, Washington, D.C. pp. 142-149. Institute for Electrical and Electronic Engineers, New York, N.Y. The failure rate of the 90 percent confidence level is more demanding than that at 50 percent level, and is the one used here. The failure rate at voltage other than that of the test is estimated from a power function of the voltage. It is common to assume a fifth power law with the voltage.

$$FR \text{ (at voltage } V_w) = FR \text{ (at voltage } V) \times \left(\frac{V_w}{V}\right)^5$$

This expression may also be used to calculate use voltages for selected failure rates. The voltage at which the failure rate is 0.02 percent is an accepted capacitor rating for high reliability.

In the practice of this invention it has been found that FR values from 1.5 to 30 or more times lower are obtained with treated as compared with untreated controls. This in turn means that the product of this invention is more reliable for the same size as the capacitor previously used, or that for the same voltage the product of this invention can be operated at a higher temperature, or that by operating at the same temperature and voltage a capacitor of this invention could be made with thinner dielectric and less foil for the same life capacitance rating as a conventional capacitor.

The invention will be described further in conjunction with the following examples.

EXAMPLE 1

A roll of lead/tin foil (13 percent PB, 87 percent Sn) 0.25 mil thick and 1.5 inches wide was immersed in distilled water in an open beaker. The temperature was held at 55° C. and the soak time was 45 minutes. The foil roll was dried in a circulating air oven at 95° C. for 1½ hours. After this a roll capacitor preform was convolutely wound with alternating foils and dielectric film. Two electrode foils and two films of 0.25 mil thick molecularly oriented polyethylene terephthalate film were used. The foils were offset from one another by 0.25 inches and wound with the foils extending 0.12 inches beyond the edge of the dielectric. The offsetting and extension of the foils avoids shorting of foil electrodes and provides exposed electrode for attachment of terminals. After winding, the capacitor preform was heated in an oven at 150° C. for 4 hours to stabilize the structure. The capacitors were of 0.5 microfarad capacity.

Capacitor preforms made in accordance with this example were subjected to accelerated life test in which the capacitors were mounted in a circulating air oven at 125° C. and stressed with 300 volts until failure occurred, or until a set period of time had elapsed. Twenty capacitors made of water treated foil were compared with the same number of untreated controls. After 250 hours, 19 of the controls had failed whereas only 10 of the treated foil capacitors had failed.

EXAMPLE 2

Capacitor preforms were prepared in accordance with example 1 with untreated aluminum foils. One half of the preforms were immersed in a beaker of aerated water for 20 minutes maintained at 60° C. Small bubbles began to appear at the edges of the capacitor preforms after 5 minutes. The capacitor preforms were removed from the beaker and the excess water was allowed to drain away. The treated preforms together with the untreated controls were placed in an oven, and heated to 150° C. for 4 hours. Then the preforms were tested as in example 1 and the accelerated life test data obtained are as follows:

TABLE I

| | Number of capacitors | Time of tests, hours | FR, failure rate/1,000 hours, percent |
|---|---|---|---|
| Water-treated capacitor | 100 | 800 | 15 |
| Control capacitors | 100 | 800 | .237 |

As can be observed, the data show the superiority of the capacitors treated in accordance with this invention over controls. The failure rate was only 15 percent per 1000 hours and a 15-fold improvement over the controls.

In addition to those data, the capacitors of this invention were found to be more rigid than the controls as shown by a crease load test as follows: The capacitor preform is placed on its side on a flat platen of a tensile testing machine operated in compression. A second flat platen is forced against the opposite side of the capacitor. As the second platen is moved the force is increased until the capacitor yields and collapses on the arbor winding hole. The force at yield and deflection are recorded. The water treated units of this invention required 52 pound load and a deflection of 0.018 inches to deform while the untreated preforms deformed at 12 pounds and a deflection of 0.012 inches.

EXAMPLE 3

Capacitor preforms were prepared and tested in accordance with example 2. Twenty of the preforms were treated with water that was boiled 20 minutes first to remove dissolved gases prior to exposure at 60° C. with water in contact with air. Twenty were treated with unboiled water. Twenty were not exposed to water. The sets were oven treated at 150° C. In the life test, two of the unexposed preforms failed in 100 hours, but none of the water exposed capacitors had failed after 500 hours.

EXAMPLE 4

Capacitor preforms were made and water treated in accordance with example 2. These capacitors were terminated. 18-gauge copper pigtail wires were soldered to each end of the capacitor and then it was dipped in Stirling Y-293 epoxy compound and oven cured at 135° C. for 3 hours. Encapsulated controls and water treated capacitors were tested for 1650 hours at 400 volts DC, 45° C. and 50 percent R.H. Once each day the oven was cooled to allow condensation to occur on the capacitor. In this period of time only 5 percent of the water treated capacitors failed while 15 percent of the untreated capacitors failed.

EXAMPLE 5

Twenty capacitors each were prepared in accordance with example 2 except that the dielectric film was changed in thickness or in kind. The test results are shown in table 2.

TABLE 2

| Dielectric [1] | Water treated | Voltage, volts DC | Test, hours | Test, temp. °C. | Failure rate/ 1,000 hrs., percent |
|---|---|---|---|---|---|
| Polyethylene terephthalate | Yes | 600 | 780 | 125 | 20 |
| Do | No | 600 | 780 | 125 | 136 |
| Polyimide film | Yes | 600 | 1,200 | 180 | 32 |
| Do | No | 600 | 1,200 | 180 | 90 |
| Perfluorocarbon film | Yes | 250 | 170 | 180 | 920 |
| Do | No | 250 | 170 | 180 | 2,350 |

[1] All film used was 0.50 mil thick.

From the data in table 2, it is evident the present discovery is effective with preforms with different dielectric films. The improvement factors ranged from 2½ to 7.

EXAMPLE 6

Forty capacitor preforms were prepared from ¼-mil polyester film and 0.25 mil lead/tin foils (13 percent Pb 87 percent Sn). Twenty preforms were given a water treatment of 20 minutes at 50° C. No bubbles formed at the edge of the preform. Both sets of preforms were heated for 4 hours at 120° C. The life test for 1500 hours at 500 volts DC and 85° C. developed no absolute failure for the water treated capacitor preforms while two of the controls failed.

Example 7

Capacitors prepared in accordance with example 2 were allowed to react with the water at different temperatures. In one set the capacitors were immersed in water at 25° C. for 45 minutes and then dried for 30 hours in a vacuum oven. A second set of capacitors was prepared from a composite roll of film and foil exposed to 55° C. water for 30 minutes and dried at 60° C. for 16 hours. In winding the capacitors the smooth side of the foil adhered to the plastic film. Both sets were given a post treatment of 4 hours at 150° C. The set treated at 55° C. had no failures after 650 hours although 70 percent of the controls had failed. The set treated at 25° C. showed no improvement over controls.

EXAMPLE 8

Capacitor preforms were prepared as described in example 2 with ¼-mil aluminum foil and ½-mil high tensile strength polyethylene terephthalate film. Forty capacitors were placed in a pressure cooker with water and heated for 5 minutes at 15 pounds per square inch gauge and then oven treated for 18 hours at 125° C. An additional 40 capacitors were given only the oven treatment. The capacitors were given a life test at 600 volts DC at 125° C. After 500 hours 88 percent of the treated capacitors were functional but only 45 percent of the controls remained functional.

From the foregoing discussion and description it is apparent that the present discovery provides an effective method in improving film-foil capacitors. While the invention has been described with certain detail, it should be apparent that changes can be made therefrom without departing from its scope.

What is claimed is:

1. A process of improving the life performance of a wound, foil-film capacitor comprising treating a fully wound, foil-film capacitor preform made by convolutely winding at least a pair of conductive metal foils and at least a pair of organic dielectric separator films, alternating film and foil, with heated water in the presence of oxygen for a period of time sufficient that the product of the temperature of said water, in degrees centigrade, times the period of time of contact, in minutes, is at least 200, and drying the resulting product at a temperature of at least 45° C. in such manner as to avoid damage by too rapid release of moisture within the preform.

2. A process according to claim 1 in which said foil is of the group consisting of lead base and aluminum base foil and said film is a dielectric of the group consisting of polyethylene terephthalate, polyimide and perfluorocarbon polymer.

3. A process according to claim 2 in which said preform is contacted with said water at a temperature of about 10° to 125° C. for about 2 to 60 minutes.

* * * * *